United States Patent
Akahori

(10) Patent No.: US 8,559,538 B2
(45) Date of Patent: Oct. 15, 2013

(54) CORRELATOR AND DEMODULATION DEVICE INCLUDING THE CORRELATOR

(75) Inventor: Hiroji Akahori, Tokyo (JP)

(73) Assignee: Oki Semiconductor Co., Ltd., Tokyo (JP)

(*) Notice: Subject to any disclaimer, the term of this patent is extended or adjusted under 35 U.S.C. 154(b) by 133 days.

(21) Appl. No.: 13/210,099

(22) Filed: Aug. 15, 2011

(65) Prior Publication Data

US 2012/0045004 A1    Feb. 23, 2012

(30) Foreign Application Priority Data

Aug. 18, 2010    (JP) ................................. 2010-183291

(51) Int. Cl.
*H04L 27/28* (2006.01)

(52) U.S. Cl.
USPC ........... 375/260; 375/316; 375/324; 375/340; 375/343

(58) Field of Classification Search
USPC .......................... 375/260, 316, 324, 340, 343
See application file for complete search history.

(56) References Cited

U.S. PATENT DOCUMENTS

| | | | |
|---|---|---|---|
| 2005/0099936 A1* | 5/2005 | Fujii et al. | 370/203 |
| 2006/0171367 A1* | 8/2006 | Wang | 370/342 |
| 2009/0028254 A1* | 1/2009 | Wang et al. | 375/260 |

FOREIGN PATENT DOCUMENTS

| | | |
|---|---|---|
| JP | 11-163824 A | 6/1999 |
| JP | 2000-059332 A | 2/2000 |
| JP | 2009-055204 A | 3/2009 |

* cited by examiner

*Primary Examiner* — Leila Malek
(74) *Attorney, Agent, or Firm* — Studebaker & Brackett PC

(57) ABSTRACT

The Present invention provides a correlator including, a read-out processing circuit that reads out an OFDM signal in RAM as 2n−1 number of delay OFDM signals that are increased and delayed sequentially with their adjusted read-out timings. Complex conjugate circuits that outputs complex conjugates of the inputted $n^{th}$ to $2n-1^{th}$ delay OFDM signals. Complex arithmetic circuits that perform complex multiplication to inputted original OFDM signal, the first to $n-1^{th}$ delay OFDM signals, and the output signals from the complex conjugate circuits. Moving average processing circuits take the moving average of the GI length, gain adjustment circuits adjust the gains, an adder circuit adds the outputs of the adjustment circuits, and a filter circuit smoothes the addition result. A control circuit variably controls the delay of the delay OFDM signals, the gains of the gain adjustment circuits, and the band characteristic of the filter circuit.

10 Claims, 7 Drawing Sheets

RELATED ART

RELATED ART

CORRELATOR AND DEMODULATION DEVICE INCLUDING THE CORRELATOR

CROSS-REFERENCE TO RELATED APPLICATION

This application claims priority under 35 USC 119 from Japanese Patent Application No. 2010-183291, filed on Aug. 18, 2010, the disclosure of which is incorporated by reference herein.

BACKGROUND OF THE INVENTION

1. Field of the Invention

The present invention relates to a correlator that determines the correlation between an OFDM signal, which has an effective symbol period and a guard interval in which part of the effective symbol signal has been copied, and a delay signal obtained by delaying the OFDM signal. The present invention also relates to a demodulation device that includes the correlator. In particular, the present invention relates to a correlator and a demodulation device including the correlator that can also cope with multipath propagation circumstances where the incoming time difference is large and the level difference (power ratio) is small.

2. Description of the Related Art

In recent years, the orthogonal frequency division multiplexing (OFDM) modulation method has been used as a modulation method in digital terrestrial broadcasting.

In the OFDM method, multiple subcarriers with different center frequencies are utilized to transmit symbols. Here, a symbol is a set of data transmitted in one modulation.

One symbol cycle is configured as a result of a guard interval (GI) being added to the effective symbol period. In the OFDM method, as shown in FIG. 7, part of the effective symbol signal serving as the actual demodulation target is copied and inserted between effective symbol signals as a repeated waveform. This allows OFDM to suppress the influence of multipath interference. The interval of this copied waveform is the guard interval.

In the case of demodulating this OFDM signal, the received OFDM signal is digitally converted by an A/D converter, the guard interval is removed, the effective symbol signal is extracted, and the effective symbol signal is demodulated by a fast Fourier transformer (FFT). Namely, as shown in FIG. 8, a correlation value between the received OFDM signal and the signal obtained by delaying the OFDM signal by the length of the effective symbol period is determined Additionally, a maximum value of a value obtained by integrating this correlation value is extracted, and, on the basis of the timing of this maximum value, the guard interval is removed, the effective symbol period is extracted, and the effective symbol period is demodulated by the FFT (e.g., see Japanese Patent Application Laid-Open (JP-A) No. 11-163824 and JP-A No. 2000-059332).

However, in a case where the received power is weak, or in a case where the influence of phasing and multipath is strong, or in a case where a narrowband noise signal has entered the reception band, sometimes the correlation value becomes small and the timing shifts or the timing becomes unable to be taken and the reception characteristic deteriorates.

In particular, a case where there is multipath will be described below. That is, a case where not only a signal incoming directly (main incoming path) but also a signal incoming slower than the main incoming path by reflection or the like (long delay path) come in on the reception side will be described.

In a conventional correlator, time-delayed received signals are not included at the time of single path reception (single path time) of only the main incoming path. For this reason, in a conventional correlator, an autocorrelation output showing one peak such as shown in FIG. 9A is obtained. However, at the time of multipath reception (multipath time) of the main incoming path and the long delay path, multiple peaks occur in accordance with incoming time differences. For example, FIG. 9B shows a two-path reception.

That is, with the conventional correlation output, the timing cannot be detected well because the correlation value becomes high the most in the time position of the main incoming path at the time of reception of only one path. However, at the time of two-path reception, a strong correlation appears in the incoming time positions of the main incoming path and the long delay path, so that, as shown in FIG. 9B, the correlation output signal resembles a trapezoid having two peaks in which there is a time difference of a peak interval equal to the delay time of the second path (called "long delay time" below). In actual transmission, the heights of these two peaks change because of the influence of interference power sections or the waveform of the OFDM signal. For this reason, in a case where a conventional correlator is used to generate time synchronization information on the basis of the maximum value of the peak, the position of the maximum correlation goes back and forth between the two time positions separated from each other by the long delay time. For this reason, in conventional correlation output, time synchronization become unstable, inter-symbol interference arises, and the reception characteristic ends up deteriorating.

Therefore, as a correlator that eliminates the above problem, for example, second and third embodiments of JP-A No. 2009-55204 discloses a correlator that can cope with this in consideration of multipath.

That is, in JP-A No. 2009-55204, the correlator employs five delay circuits, or a memory circuit, an address decoder, and a selector having the same functions as those, and three difference correlation circuits to add three correlation outputs whose time positions have been delayed and output the correlation outputs as one correlation signal. For this reason, in this technology, in a case where there exists a long delay path having the same received power as the path that becomes the main incoming wave, a strong correlation appears in the middle position of the main incoming path and the long delay path. Consequently, according to JP-A No. 2009-55204, it becomes possible to prevent a strong correlation from appearing in the incoming positions of the main incoming path and the long delay path and to suppress time synchronization instability.

However, particularly under multipath propagation circumstances where the incoming time difference is large and the level difference is small, the effect is insufficient even with the technology disclosed in JP-A No. 2009-55204.

SUMMARY OF THE INVENTION

The present invention provides a correlator and a demodulation device including the correlator that may suppress time synchronization instability and reception characteristic deterioration even under multipath propagation circumstances where the incoming time difference is large and the level difference is small.

A first aspect of the invention is a correlator including: a delay signal generation section that sequentially generates, from an orthogonal frequency division multiplexing (OFDM) signal where one symbol period comprises an effective symbol period and a guard interval in which part of the signal of the effective symbol period has been copied, 2n−1 number of delay OFDM signals whose delay times increase; n number of complex conjugate sections to which the $n^{th}$ to $2n-1^{th}$ delay OFDM signals are inputted, and that generates and outputs corresponding complex conjugates; n number of complex calculation sections to which the OFDM signal and the first to $n-1^{th}$ delay OFDM signals are inputted as one input and to which the output signals from the n number of complex conjugate sections are inputted as another input, and that perform complex multiplication in regard to the two input signals; n number of moving average processing sections, disposed in correspondence to each of the n number of complex calculation sections, that take the moving average of the guard interval length with respect to the output signals from the corresponding complex calculation sections; and an addition section that adds the output signals from the n number of moving average processing sections, and that outputs the addition result.

That is, according to the first aspect of the invention, the first aspect employs a correlator that has n number of arithmetic circuits for obtaining autocorrelations, delays the input timings of the input signals, generates n number of autocorrelations whose times are delayed, and combines these. Accordingly, the first aspect of the invention may alleviate, in a receiver having a synchronization function of determining time synchronization on the basis of peaks of autocorrelations, time fluctuation of maximum peaks in multipath circumstances, where the incoming time difference is large, the power ratio is small, and reception becomes difficult. Thus, the first aspect of the invention may improve the reception characteristic.

In a second aspect of the invention, in the above first aspect, may further include n number of gain adjustment sections disposed, in correspondence to each of the n number of moving average processing sections, between the n number of moving average processing sections and the adding section, and that perform gain adjustment with respect to the output signals from the corresponding moving average processing sections.

In a third aspect of the invention, in the above first aspect, may further include a filter section to which the addition result of the addition section is inputted and which smoothes and outputs the smoothed addition result.

According to the above aspects of the invention, a waveform resembling a gently sloping mountain with one peak may be reliably obtained as the autocorrelation signal.

In a fourth aspect of the invention, in the above first aspect, further including a control section that variably controls the delay times of the 2n−1 number of delay OFDM signals generated by the delay signal generation section.

In a fifth aspect of the invention, in the above second aspect, may further include a control section that variably controls the gains of the n number of gain adjustment sections.

In a sixth aspect of the invention, in the above third aspect, may further include a control section that variably controls the filter band characteristic of the filter section.

According to the above aspects of the invention, the delay times of the delay OFDM signals, the gains of the gain adjustment sections, and the band characteristic of the filter circuit can be overall optimally controlled in accordance with delay times and power differences in the multipath propagation channel. Consequently, the above aspects of the invention may realize further time synchronization stabilization, and may obtain a higher reception characteristic.

In a seventh aspect of the invention, in the above first aspect, the delay signal generation section may be configured by 2n−1 number of hardware delay circuits connected in series.

In an eighth aspect of the invention, in the above first aspect, the delay signal generation section may be configured to include, a memory that stores the OFDM signal, and a read-out processing section that adjusts the read-out timing and reads out the OFDM signal stored in the memory.

According to the eighth aspect of the invention, circuit size may be reduced and consumed power may also be reduced.

In a ninth aspect of the invention, in the above first aspect, n may be 3.

A tenth aspect of the invention is a demodulation device including: an analog-to-digital conversion section that converts into a digital signal an analog orthogonal frequency division multiplexing (OFDM) signal where one symbol period comprises an effective symbol period and a guard interval in which part of the signal of the effective symbol period has been copied; the correlator according of claim 1 to which the digital OFDM signal is inputted; a timing detection section that outputs, on the basis of a correlation signal received from the correlator, a timing signal for extracting the effective symbol signal from the OFDM signal; a fast Fourier transform section that, on the basis of the timing signal that has been outputted from the timing detection section, extracts the effective symbol signal from the OFDM signal that has been digitally converted by the analog-to-digital conversion section, and that performs Fourier transform with respect to the effective symbol signal; and a demodulation section that performs demodulation processing on the signal after the Fourier transform process by the fast Fourier transform section to obtain a demodulated signal.

That is, the tenth aspect of the invention employs a demodulation device including the correlator. Accordingly, the tenth aspect of the invention may alleviate, in a receiver having a synchronization function of determining time synchronization on the basis of peaks of autocorrelations, time fluctuation of maximum peaks in multipath circumstances, where the incoming time difference is large, the power ratio is small, and reception becomes difficult. Thus, the tenth aspect of the invention may improve the reception characteristic.

As described above, according to the above aspects of the present invention, time synchronization instability may be suppressed and reception characteristic deterioration may be alleviated even under multipath propagation circumstances, where the incoming time difference is large and the level difference is small.

BRIEF DESCRIPTION OF THE DRAWINGS

Exemplary embodiments of the present invention will be described in detail based on the following figures, wherein.

DETAILED DESCRIPTION OF THE INVENTION

Preferred exemplary embodiments of the present invention will be described in detail below with reference to the drawings.

[First Exemplary Embodiment]

Figure 1:
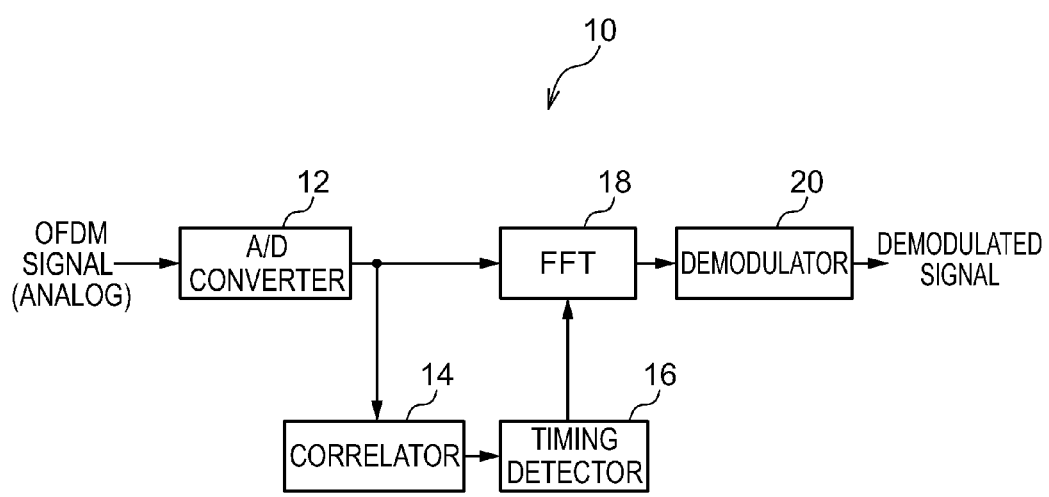
FIG. 1 is a schematic configuration diagram of an OFDM signal demodulation device according to first to third exemplary embodiments of the present invention.
Figure 7:
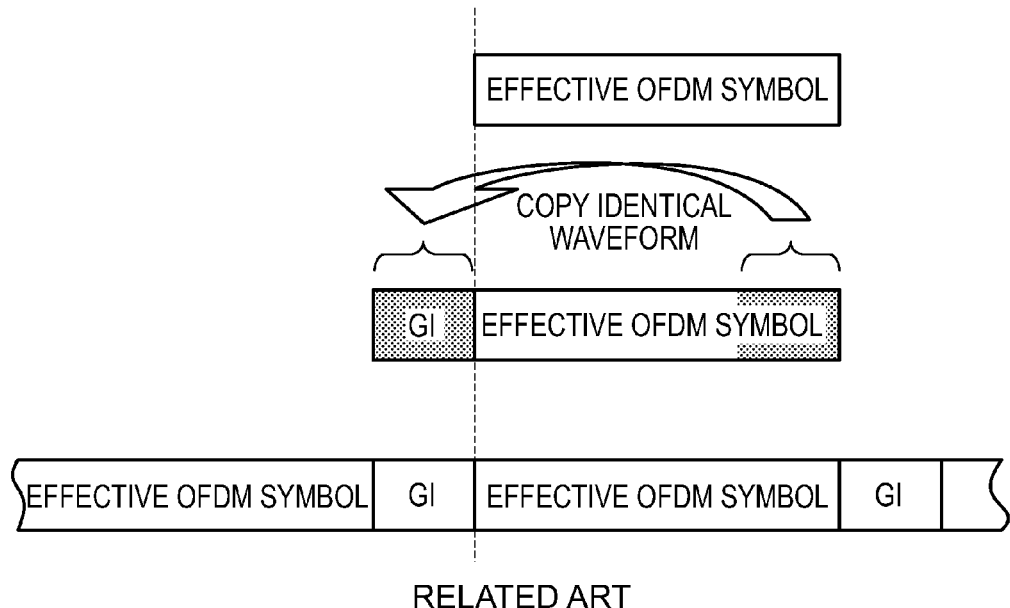
FIG. 7 is a diagram describing the format of an OFDM signal.
Figure 8:
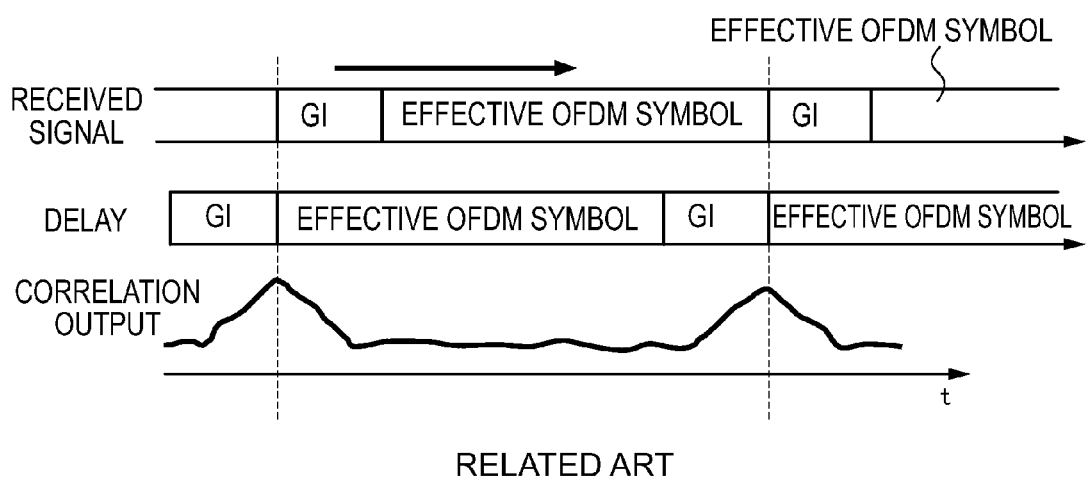
FIG. 8 is an explanatory diagram describing a conventional method of determining a correlation value between a received OFDM signal and a signal obtained by delaying the OFDM signal by the length of an effective symbol period.

FIG. 1 is a schematic configuration diagram of an orthogonal frequency division multiplexing (OFDM) signal demodulation device 10 according to a first exemplary embodiment of the present invention. The OFDM signal demodulation device 10 is a device that receives and demodulates an OFDM signal. As shown in FIG. 7, the OFDM signal is a signal where one symbol period includes an effective symbol period and a guard interval in which part of the signal of the effective symbol period has been copied. The signal of the effective symbol period excluding the guard interval is extracted from this OFDM signal, Fourier transform is performed on the signal of the effective symbol period (effective symbol signal), and the effective symbol signal is demodulated.

As shown in FIG. 1, the OFDM signal demodulation device 10 is equipped with an A/D converter 12, a correlator 14, a timing detector 16, a fast Fourier transformer (FFT) 18, and a demodulator 20.

The A/D converter 12 samples, in a predetermined cycle in synchronization with a sampling clock signal, a received analog OFDM signal, converts the analog OFDM signal into a digital signal, and outputs the digital signal to the correlator 14 and the FFT 18.

The correlator 14 determines the correlation between the OFDM signal that has been converted into the digital signal and a delay signal obtained by delaying the OFDM signal by one effective symbol period, and outputs a correlations signal representing the correlation to the timing detector 16.

The timing detector 16 outputs, on the basis of the correlation signal received from the correlator 14, a timing signal for extracting the effective symbol signal from the OFDM signal. Specifically, the timing detector 16 detects the timing when the correlation signal reaches a peak, and outputs the timing signal on the basis of this timing.

The FFT 18 extracts, on the basis of the timing signal that has been outputted from the timing detector 16, the effective symbol period from the OFDM signal that has been digitally converted by the A/D converter 12, and performs Fourier transform on the effective symbol signal.

The demodulator 20 performs demodulation processing on the signal after the Fourier transform process, to obtain a demodulated signal.

Figure 2:
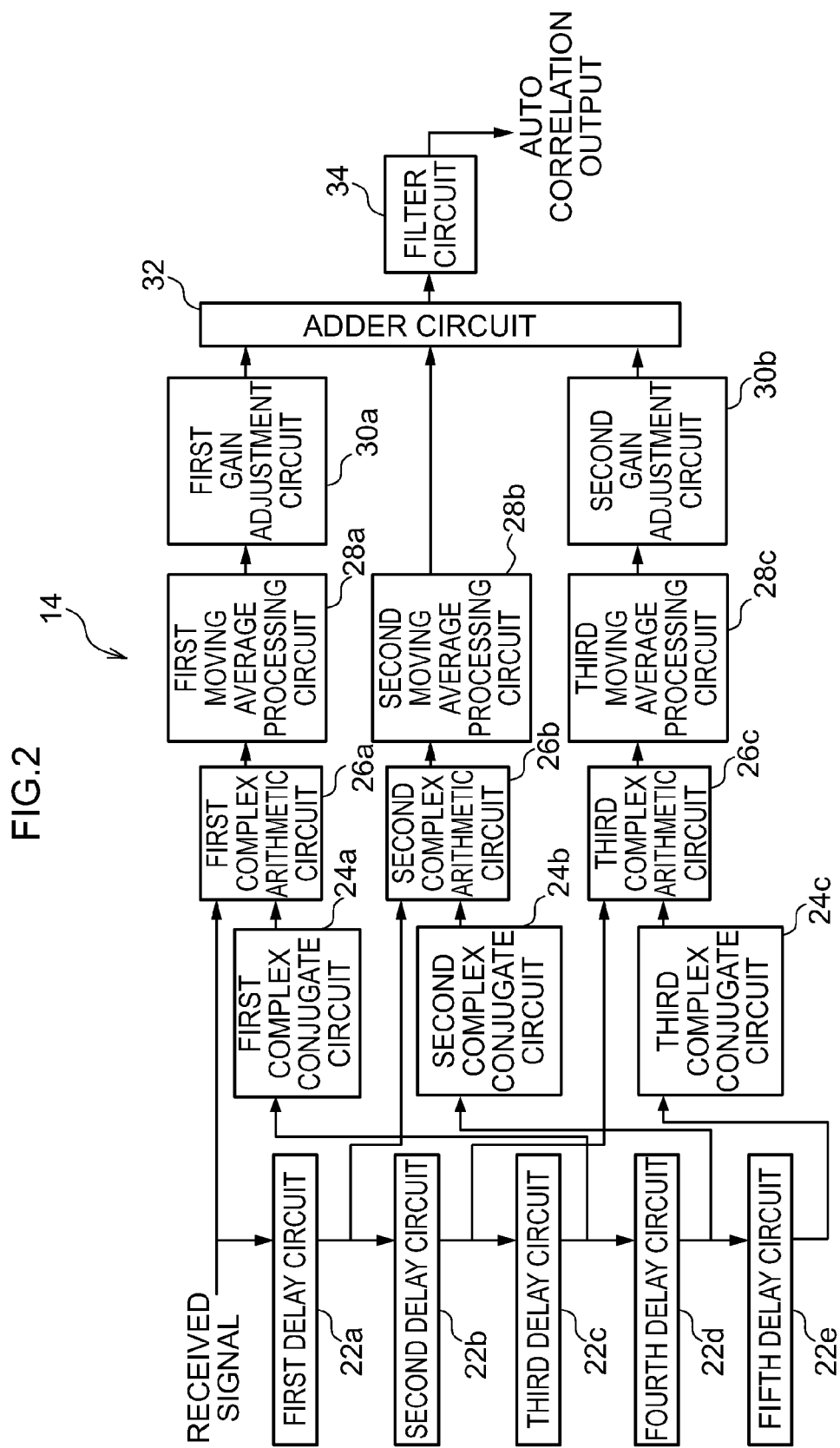
FIG. 2 is a configuration diagram of a correlator of the first exemplary embodiment.

FIG. 2 is a configuration diagram of the correlator 14 of the first exemplary embodiment.

The correlator 14 of the present exemplary embodiment is equipped with five delay circuits (a first delay circuit 22*a*, a second delay circuit 22*b*, a third delay circuit 22*c*, a fourth delay circuit 22*d*, and a fifth delay circuit 22*e*), three complex conjugate circuits (a first complex conjugate circuit 24*a*, a second complex conjugate circuit 24*b*, and a third complex conjugate circuit 24*c*), three complex arithmetic circuits (a first complex arithmetic circuit 26*a*, a second complex arithmetic circuit 26*b*, and a third complex arithmetic circuit 26*c*), three moving average processing circuits (a first moving average processing circuit 28*a*, a second moving average processing circuit 28*b*, and a third moving average processing circuit 28*c*), two gain adjustment circuits (a first gain adjustment circuit 30*a* and a second gain adjustment circuit 30*b*), an adder circuit 32, and a filter circuit 34.

In the case of describing the delay circuits without distinguishing between them, the delay circuits will simply be called "the delay circuits 22" and the trailing letters will be omitted. Similarly, the three complex conjugate circuits have identical configurations, and in the case of describing the complex conjugate circuits without distinguishing between them below, the complex conjugate circuits will simply be called "the complex conjugate circuits 24" and the trailing letters will be omitted. Further, the three complex arithmetic circuits have identical configurations, and in the case of describing the complex arithmetic circuits without distinguishing between them below, the complex arithmetic circuits will simply be called "the complex arithmetic circuits 26" and the trailing letters will be omitted. Similarly, the three moving average processing circuits have identical configurations, and in the case of describing the moving average processing circuits without distinguishing between them below, the moving average processing circuits will simply be called "the moving average processing circuits 28" and the trailing letters will be omitted. The same is also true of the gain adjustment circuits.

The OFDM signal before delay that has been outputted from the A/D converter 12 is inputted to the first complex arithmetic circuit 26*a* and is also inputted to the first delay circuit 22*a*. The output end of the first delay circuit 22*a* is connected to the second delay circuit 22*b* and to the second complex arithmetic circuit 26*b*. The output end of the second delay circuit 22*b* is connected to the third delay circuit 22*c* and to the third complex arithmetic circuit 26*c*. The output end of the third delay circuit 22*c* is connected to the fourth delay circuit 22*d* and to the first complex conjugate circuit 24*a*. The output end of the fourth delay circuit 22*d* is connected to the fifth delay circuit 22*e* and to the second complex conjugate circuit 24*b*. The output end of the fifth delay circuit 22*e* is connected to the third complex conjugate circuit 24*c*.

That is, focusing on only the five delay circuits 22, the five delay circuits 22 are connected in series, sequentially delay the inputted signals by the delay times that each has, and output the signals.

Here, the delay times of the delay circuits 22 have the following relationship. That is, the total of the delay times of the first delay circuit 22*a*, the second delay circuit 22*b*, and the third delay circuit 22*a*, the total of the delay times of the second delay circuit 22*b*, the third delay circuit 22*c*, and the fourth delay circuit 22*d*, and the total of the delay times of the third delay circuit 22*c*, the fourth delay circuit 22*d*, and the fifth delay circuit 22*e* are mutually equal. Namely, the totals of the delay times are one effective OFDM symbol period (the length of the OFDM modulated wave not including the GI). Accordingly, the delay time of the first delay circuit 22*a* and the delay time of the fourth delay circuit 22*d* become equal. Further, the delay time of the second delay circuit 22*b* and the delay time of the fifth delay circuit 22*e* become equal.

Further, focusing on the three complex conjugate circuits 24, the first complex conjugate circuit 24*a* takes the complex conjugate with respect to the delay signal from the third delay circuit 22*c*. Further, the second complex conjugate circuit 24*b* takes the complex conjugate with respect to the delay signal from the fourth delay circuit 22d. Further, the third complex conjugate circuit 24c takes the complex conjugate with respect to the delay signal from the fifth delay circuit 22e.

The three complex conjugate circuits 24 may also have a configuration in which they are connected to the signal sides before delay by the one effective symbol period and take the complex conjugate with respect to those. That is, the first complex conjugate circuit 24a may be configured to take the complex conjugate with respect to the direct OFDM signal from the A/D converter 12. Further, the second complex conjugate circuit 24b may be configured to take the complex conjugate with respect to the signal from the first delay circuit 22a. Moreover, the third complex conjugate circuit 24c may be configured to take the complex conjugate with respect to the signal from the second delay circuit 22b.

Next, the first complex arithmetic circuit 26a complex-multiplies the direct OFDM signal from the A/D converter 12 and the complex conjugate with respect to the signal that has been delayed by one effective symbol period from the third delay circuit 22c.

The second complex arithmetic circuit 26b complex-multiplies the signal from the first delay circuit 22a and the signal after complex conjugation has been performed with respect to the signal that has been delayed by one effective symbol period from the fourth delay circuit 22d.

The third complex arithmetic circuit 26c complex-multiplies the signal from the second delay circuit 22b and the signal after complex conjugation has been performed with respect to the signal that has been delayed by one effective symbol period from the fifth delay circuit 22e.

Next, the first moving average processing circuit 28a takes the moving average of the guard interval (GI) length with respect to the output from the first complex arithmetic circuit 26a. That is, as described in FIG. 7, the GI portion is identical to part of the OFDM signal, and the maximum autocorrelation effect should be obtained in a case where that portion matches. However, because the time position at which the maximum autocorrelation effect is obtained is not known beforehand, the first moving average processing circuit 28a searches for that time position in regard to that GI length.

Similarly, the second moving average processing circuit 28b takes the moving average of the GI length with respect to the output from the second complex arithmetic circuit 26b. Further, the third moving average processing circuit 28c takes the moving average of the GI length with respect to the output from the third complex arithmetic circuit 26c.

Figure 3:
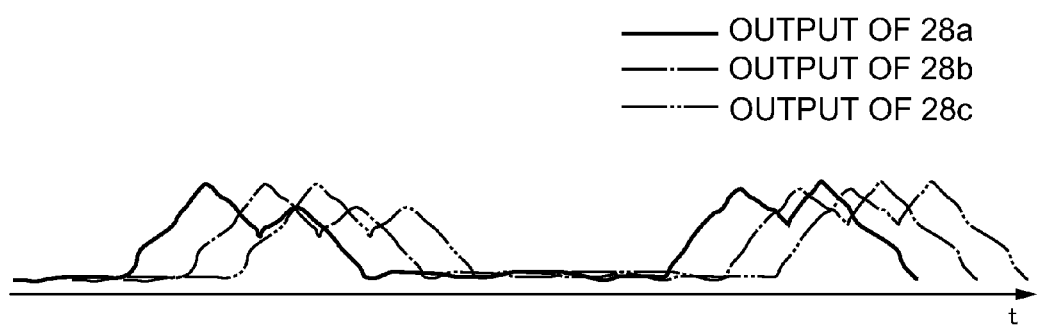
FIG. 3 is a diagram showing output waveforms of a first moving average processing circuit, a second moving average processing circuit, and a third moving average processing circuit according to the exemplary embodiments of the present invention.

FIG. 3 shows the output waveforms of the first moving average processing circuit 28a, the second moving average processing circuit 28b, and the third moving average processing circuit 28c at this time. The solid line is the output of the first moving average processing circuit 28a, the single-dashed chain line is the output of the second moving average processing circuit 28b, and the double-dashed chain line is the output of the third moving average processing circuit 28c. FIG. 3 particularly shows a case where the delay time of the first delay circuit 22a and the delay time of the second delay circuit 22b are equal.

Next, the first gain adjustment circuit 30a performs predetermined gain adjustment with respect to the output of the first moving average processing circuit 28a. Similarly, the second gain adjustment circuit 30b performs predetermined gain adjustment with respect to the output of the third moving average processing circuit 28c.

Figure 9A:
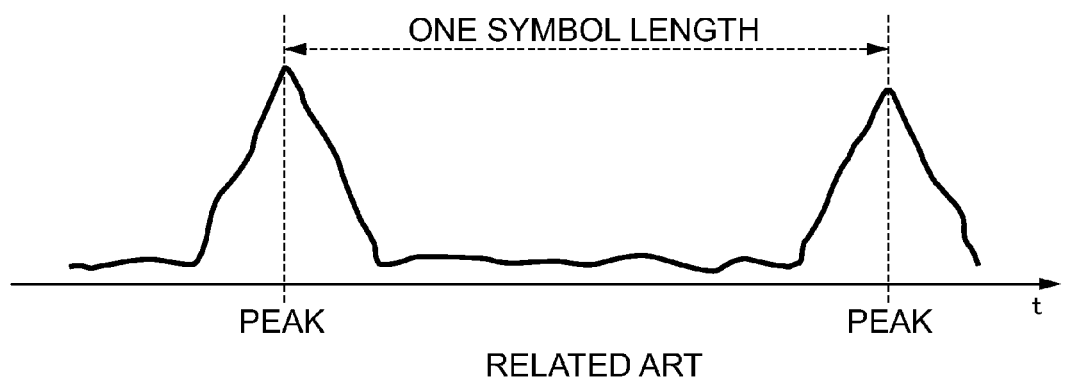
FIG. 9A and FIG. 9B are diagrams showing single path and multipath autocorrelation outputs.
Figure 9B:
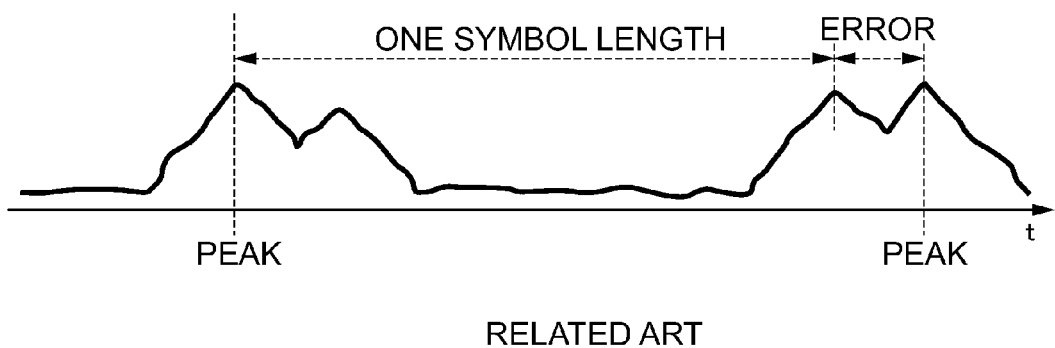

The adder circuit 32 adds and combines the outputs of the first gain adjustment circuit 30a, the second moving average processing circuit 28b, and the second gain adjustment circuit 30b. Because of this combination, the waveform does not have a shape in which there are two large mountains such as shown in FIG. 9B, but changes to a trapezoidal waveform.

Figure 4:
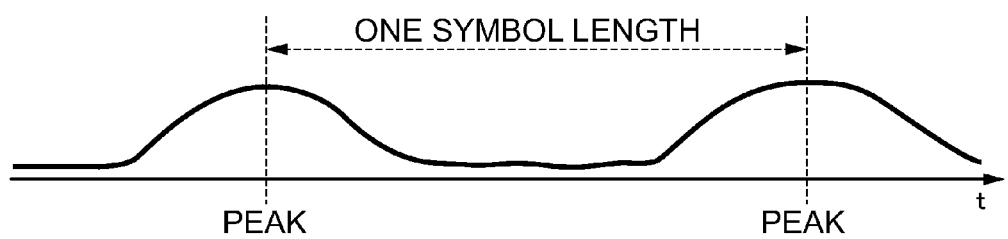
FIG. 4 is a diagram showing an output waveform of a filter circuit according to the exemplary embodiments of the present invention.

The signal of the result of addition by the adder circuit 32 is inputted to the filter circuit 34, and the filter circuit 34 smoothes and outputs the signal. FIG. 4 shows the output waveform of the filter circuit 34. As shown in FIG. 4, the waveform after having passed through the filter circuit 34 becomes a waveform resembling a gently sloping mountain with one peak.

The output of the filter circuit 34 becomes the output as the autocorrelation signal of the correlator 14.

As described above, the present exemplary embodiment employs a correlator that has three conventional arithmetic circuits for obtaining autocorrelations, delays the input timings of the input signals, generates three autocorrelations whose times are delayed, combines these, and also filter-processes these. Accordingly, the present exemplary embodiment may alleviate, in a receiver having a synchronization function of determining time synchronization on the basis of peaks of autocorrelations, time fluctuation of maximum peaks in multipath circumstances where the incoming time difference is large, the power ratio is small, and reception becomes difficult. Thus, the present exemplary embodiment may improve the reception characteristic.

There are cases where, depending on delay times, power differences in the multipath propagation channel, and the delay times of the first delay circuit 22a and the second delay circuit 22b, the output of the filter circuit 34 may not become a waveform resembling a gently sloping mountain with one peak. In such case, the present exemplary embodiment can adjust the gains of the first gain adjustment circuit 30a and the second gain adjustment circuit 30b to thereby adjust the level ratio of the three waveforms added by the adder circuit 32. Moreover, the present exemplary embodiment may stabilize the peak time position representing the maximum value at the time these have been added, and may realize a gently sloping waveform with one peak.

[Second Exemplary Embodiment]

In the present exemplary embodiment, an example where the correlator is equipped with a write processing circuit, a memory, and a read-out processing circuit, instead of the delay circuits of the first exemplary embodiment, will be described.

Figure 5:
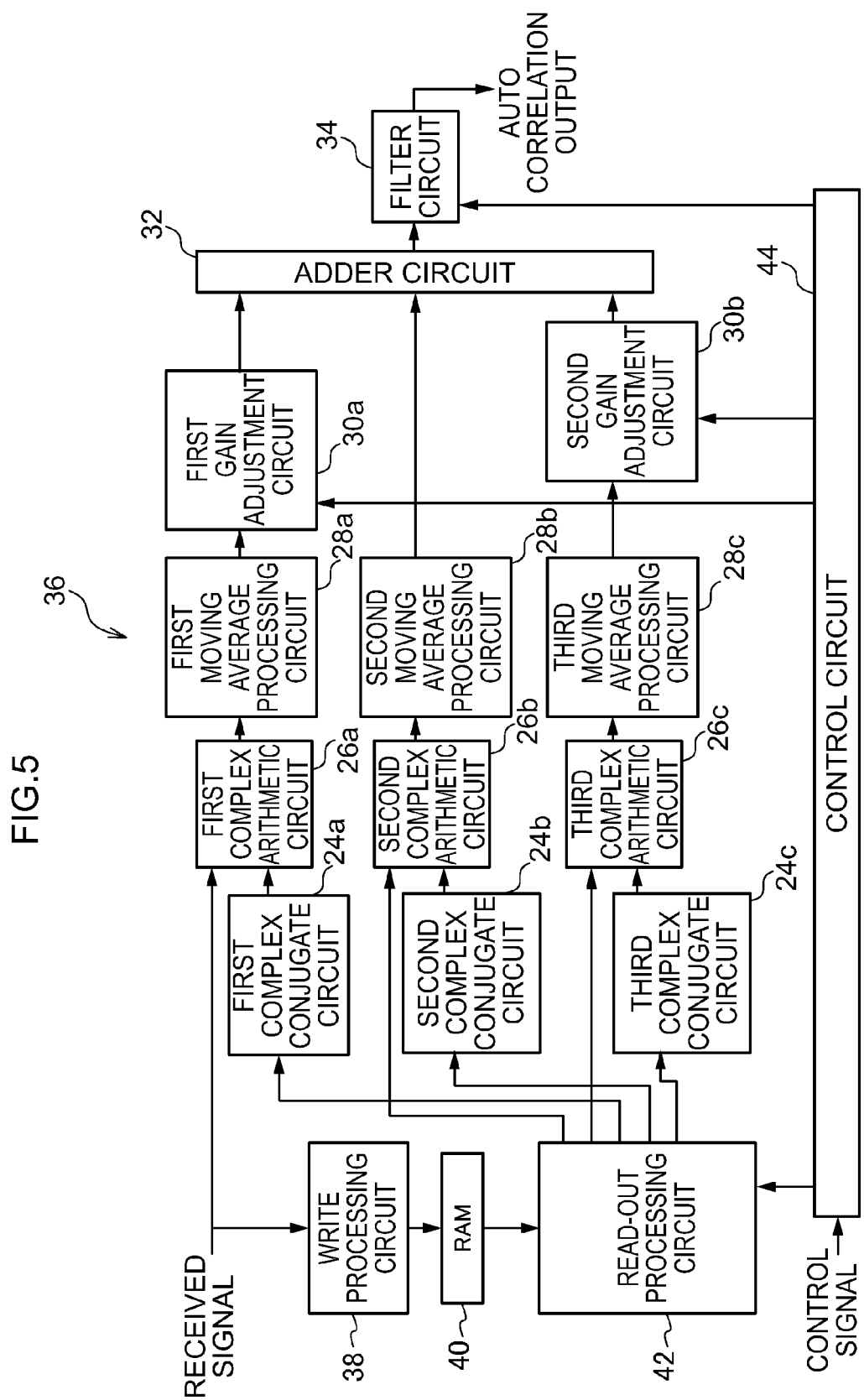
FIG. 5 is a configuration diagram of a correlator of the second exemplary embodiment.

FIG. 5 is a diagram showing the configuration of a correlator 36 of the present exemplary embodiment. The configuration of the OFDM demodulation device 10 is the same as in the first exemplary embodiment, except that the correlator 14 is replaced by the correlator 36, and therefore detailed description will be omitted.

As shown in FIG. 5, the correlator 36 of the present exemplary embodiment is disposed with a write processing circuit 38, a random access memory (RAM) 40, and a read-out processing circuit 42, instead of the delay circuits 22 of the correlator 14 of the first exemplary embodiment, and is further equipped with a control circuit 44.

The present exemplary embodiment employs a memory, instead of the delay circuits as hardware in the first exemplary embodiment, and controls the timing of the read-out from that memory. Because of this, the present exemplary embodiment may provide the same functions as the delay circuits, may reduce circuit size, and may reduce consumed power.

Specifically, the write processing circuit 38 performs processing that sequentially writes the OFDM signal from the A/D converter 12 in the RAM 40.

Further, the read-out processing circuit 42 reads out, at a timing instructed by the control circuit 44, the OFDM signal that has been written in the RAM 40 and sends the OFDM signal to the second complex arithmetic circuit 26b, the third complex arithmetic circuit 26c, the first complex conjugate circuit 24a, the second complex conjugate circuit 24b, and the third complex conjugate circuit 24c. That is, like in the first exemplary embodiment, under the control of the control circuit 44, the OFDM signal that has been delayed a predetermined amount is sent to the second complex arithmetic circuit 26b, the third complex arithmetic circuit 26c, the first complex conjugate circuit 24a, the second complex conjugate circuit 24b, and the third complex conjugate circuit 24c.

Further, the control circuit 44 can also control the gains of the gain adjustment circuits 30a and 30b and the band characteristic of the filter circuit 34. Moreover, the control circuit 44 overall optimally controls the read-out timing from the RAM 40, the gains of the gain adjustment circuits 30a and 30b, and the band characteristic of the filter circuit 34 in accordance with delay times and power differences in the multipath propagation channel.

Here, a RAM is employed as the memory, however other memory may also be employed.

The complex conjugate circuits 24, the complex arithmetic circuits 26, the moving average processing circuits 28, the gain adjustment circuits 30, the adder circuit 32, and the filter circuit 34 are the same as those in the first exemplary embodiment, and therefore description thereof will be omitted.

According to the above configuration, effects that are the same as those of the first exemplary embodiment may also be obtained by the second exemplary embodiment. Moreover, in the second exemplary embodiment, the control circuit overall optimally controls the read-out timing from the RAM (that is, the delay times), the gains of the gain adjustment circuits, and the band characteristic of the filter circuit in accordance with delay times and power differences in the multipath propagation channel. Consequently, the second exemplary embodiment may realize further time synchronization stabilization, and may obtain a higher reception characteristic.

[Third Exemplary Embodiment]

In the present exemplary embodiment, an example in which the example of the second exemplary embodiment is generalized will be described.

Figure 6:
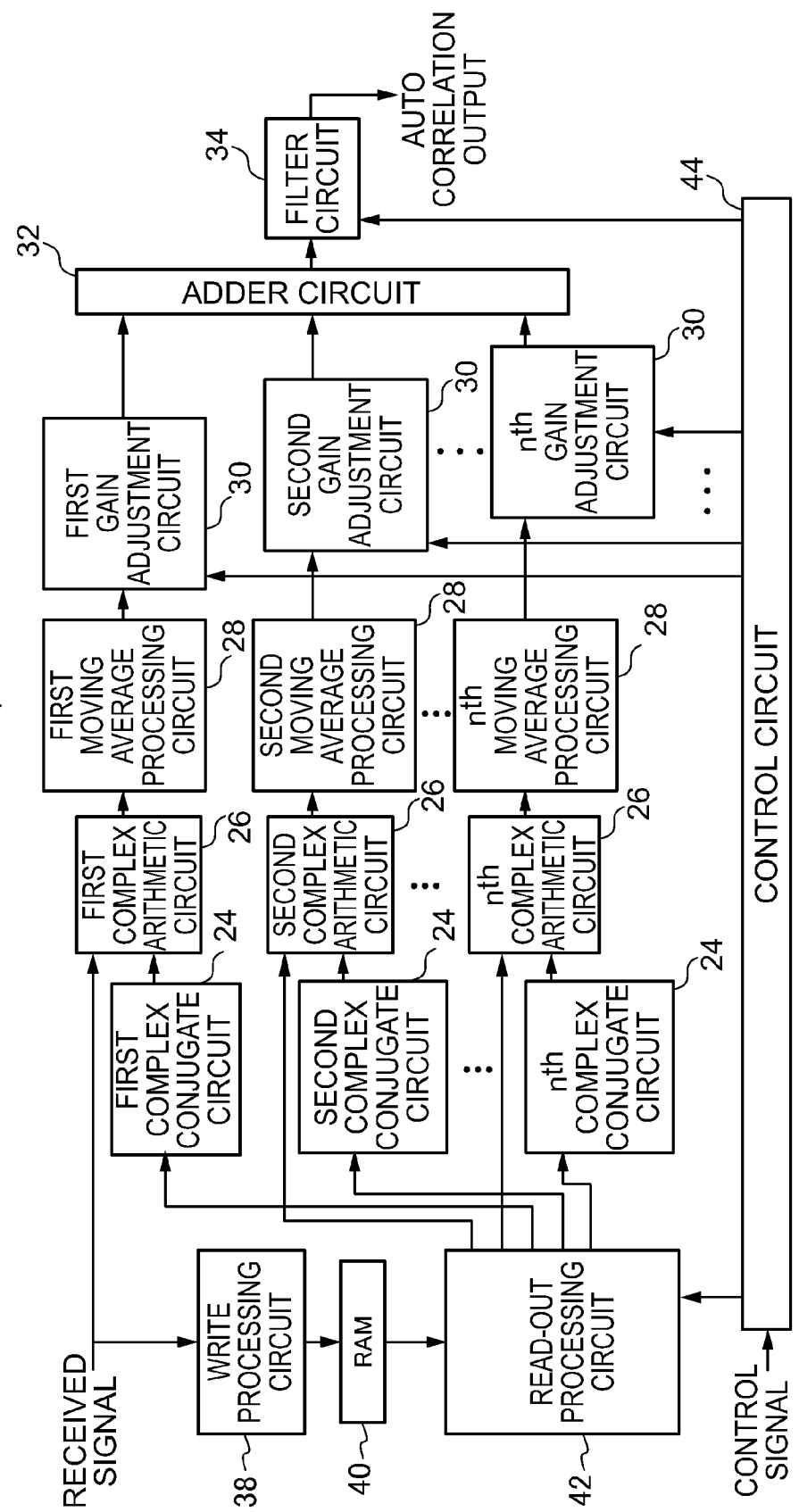
FIG. 6 is a configuration diagram of a correlator of a third exemplary embodiment.

That is, in the second exemplary embodiment, there were three each of the complex conjugate circuits 24, the complex arithmetic circuits 26, and the moving average processing circuits 28. However, in the present exemplary embodiment, as shown in FIG. 6, the number of each of those may be changed to n number equal to or greater than three. Further, in the present exemplary embodiment, the number of the gain adjustment circuits 30 may also be changed to n number equal to or greater than three, in correspondence to the number of each of those.

In accompaniment with this, the signal data are read out from the RAM 40 at 2n-1 number of delay timings by the control circuit 44, and are sent to the second to $n^{th}$ complex arithmetic circuits 26 and the first to $n^{th}$ complex conjugate circuits 24. Further, the adder circuit 32 adds and combines the n number of outputs from the first to $n^{th}$ gain adjustment circuits 30. The details of processing in the complex conjugate circuits 24, the complex arithmetic circuits 26, the moving average processing circuits 28, and the gain adjustment circuits 30 are basically the same as in the second exemplary embodiment, and the waveforms of the autocorrelations become delayed autocorrelations.

In this configuration, the larger n is (in other words, the greater the number of autocorrelation waveforms there are), the more the time position of the peak appearing in the waveform after the addition by the adder circuit 32 becomes stable.

Further, because the gain adjustment circuits 30 are disposed with respect to the outputs of the moving average processing circuits 28, that is, with respect to the output waveforms of the autocorrelations, the gains can be adjusted individually. Accordingly, the present invention may generate more appropriate waveforms.

In the description of the exemplary embodiments above, the second and third exemplary embodiments which have a control circuit have been described as having a RAM as a delay section. However, the delay section may also be configured by plural delay circuits like in the first exemplary embodiment. Further, the third exemplary embodiment with the n-stage configuration has been described as having a RAM as the delay section. However, the delay section may also be configured by plural delay circuits like in the first exemplary embodiment.

Further, the exemplary embodiments above have been described as including gain adjustment circuits and a filter circuit. However, as the present invention, expected effects are obtained even without these configurations, and when these exist, there are more exceptional effects.

What is claimed is:

1. A correlator comprising:
   a delay signal generation section that sequentially generates, from an orthogonal frequency division multiplexing (OFDM) signal where one symbol period comprises an effective symbol period and a guard interval in which part of the signal of the effective symbol period has been copied, 2n-1 number of delay OFDM signals whose delay times increase;
   n number of complex conjugate circuits to which the $n^{th}$ to $2n-1^{th}$ delay OFDM signals are inputted, and that generates and outputs corresponding complex conjugates;
   n number of complex calculation circuits to which the OFDM signal and the first to $n-1^{th}$ delay OFDM signals are inputted as one input and to which the output signals from the n number of complex conjugate circuits are inputted as another input, and that perform complex multiplication in regard to the two input signals;
   n number of moving average processing circuits, disposed in correspondence to each of the n number of complex calculation circuits, that take the moving average of the guard interval length with respect to the output signals from the corresponding complex calculation circuits; and
   an adder circuit that adds the output signals from the n number of moving average processing circuits, and that outputs the addition result;
   where n is an integer that is greater than or equal to 2.

2. The correlator according to claim 1, further comprising n number of gain adjustment circuits disposed, in correspondence to each of the n number of moving average processing circuits, between the n number of moving average processing circuits and the adder circuit, and that perform gain adjustment with respect to the output signals from the corresponding moving average processing circuits.

3. The correlator according to claim 1, further comprising a filter circuit to which the addition result of the adder circuit is inputted and which smoothes and outputs the smoothed addition result.

4. The correlator according to claim 1, further comprising a control circuit that variably controls the delay times of the 2n-1 number of delay OFDM signals generated by the delay signal generation section.

5. The correlator according to claim 2, further comprising a control circuit that variably controls the gains of the n number of gain adjustment circuits.

6. The correlator according to claim 3, further comprising a control circuit that variably controls the filter band characteristic of the filter circuit.

7. The correlator according to claim 1, wherein the delay signal generation section is configured by 2n−1 number of hardware delay circuits connected in series.

8. The correlator according to claim 1, wherein the delay signal generation section is configured to include,
a memory that stores the OFDM signal, and
a read-out processing circuit that adjusts read-out timing and reads out the OFDM signal stored in the memory.

9. The correlator according to claim 1, wherein n is 3.

10. A demodulation device comprising:
an analog-to-digital conversion section that converts into a digital signal an analog orthogonal frequency division multiplexing (OFDM) signal where one symbol period comprises an effective symbol period and a guard interval in which part of the signal of the effective symbol period has been copied;
the correlator according of claim 1 to which the digital OFDM signal is inputted;
a timing detection section that outputs, on the basis of a correlation signal received from the correlator, a timing signal for extracting the effective symbol signal from the OFDM signal;
a fast Fourier transform section that, on the basis of the timing signal that has been outputted from the timing detection section, extracts the effective symbol signal from the OFDM signal that has been digitally converted by the analog-to-digital conversion section, and that performs Fourier transform with respect to the effective symbol signal; and
a demodulation section that performs demodulation processing on the signal after the Fourier transform process by the fast Fourier transform section to obtain a demodulated signal.

* * * * *